United States Patent
Latham et al.

(10) Patent No.: US 9,245,547 B1
(45) Date of Patent: Jan. 26, 2016

(54) MAGNETIC SENSOR HAVING ENHANCED LINEARIZATION

(71) Applicant: ALLEGRO MICROSYSTEMS, LLC, Worcester, MA (US)

(72) Inventors: Alexander Latham, Harvard, MA (US); Michael G. Ward, Wells, ME (US)

(73) Assignee: ALLEGRO MICROSYSTEMS, LLC, Worcester, MA (US)

( * ) Notice: Subject to any disclaimer, the term of this patent is extended or adjusted under 35 U.S.C. 154(b) by 0 days.

(21) Appl. No.: 14/626,301

(22) Filed: Feb. 19, 2015

(51) Int. Cl.
  *G11B 5/09* (2006.01)
  *G11B 5/39* (2006.01)
  *B82Y 25/00* (2011.01)

(52) U.S. Cl.
  CPC .............. *G11B 5/3903* (2013.01); *B82Y 25/00* (2013.01); *G11B 5/3954* (2013.01)

(58) Field of Classification Search
  None
  See application file for complete search history.

(56) References Cited

U.S. PATENT DOCUMENTS

| | | | | |
|---|---|---|---|---|
| 5,657,756 A | * | 8/1997 | Vrba | G01R 33/022 324/244 |
| 2003/0052679 A1 | * | 3/2003 | Morris | G01R 33/3808 324/318 |
| 2003/0103647 A1 | * | 6/2003 | Rui | G06K 9/00234 382/103 |
| 2013/0049748 A1 | * | 2/2013 | Sebastiano | G01R 33/0017 324/252 |
| 2013/0334311 A1 | * | 12/2013 | Pant | G06K 7/082 235/449 |

* cited by examiner

*Primary Examiner* — Tan X Dinh
(74) *Attorney, Agent, or Firm* — Daly, Crowley, Mofford & Durkee, LLP

(57) ABSTRACT

Method and apparatus for a magnetic sensor device having a magnetic field sensing element to generate an output signal and a signal processing module coupled to the magnetic field sensing element, the signal processing module including a linearization module to apply a third order Taylor expansion term to the output signal generated by the magnetic field sensing element. An output module can receive the linearized signal from the linearization module and provide a device output signal.

33 Claims, 12 Drawing Sheets

MAGNETIC SENSOR HAVING ENHANCED LINEARIZATION

BACKGROUND

Magnetic sensors are widely used in modern systems to measure or detect physical parameters such as magnetic field strength, current, position, motion, orientation, and so forth. There are many different types of sensors for measuring magnetic fields and other parameters. However, such sensors suffer from various limitations, for example, excessive size, inadequate sensitivity and/or dynamic range, cost, reliability and the like.

SUMMARY

In one aspect of the invention, a magnetic sensor device comprises: a magnetic field sensing element to generate an output signal; a signal processing module coupled to the magnetic field sensing element, the signal processing module including a linearization module to apply a third order Taylor expansion term to the output signal generated by the magnetic field sensing element; and an output module to receive the linearized signal from the linearization module and provide a device output signal.

The device can further include one or more of the following features: the magnetic field sensing element comprises a GMR element, the magnetic field sensing element comprises one or more of a Hall effect element, a magnetoresistive element, and/or a magnetotransistor, the field sensing element comprises a magnetoresistive element selected from a group consisting of a semiconductor magnetoresistive element, a giant magnetoresistive (GMR) element, an anisotropic magnetoresistive element (AMR), a tunneling magnetoresistive (TMR) element, and a magnetic tunnel junction (MTJ), the magnetic field sensing element comprises magnetic sensors arranged in a Wheatstone bridge configuration, the magnetic sensors are disposed on a shaped conductor for current sensing, first and second ones of the magnetic sensors are magnetically shielded for linear field sensing, the third order Taylor expansion term is implemented in an analog circuit, the third order Taylor expansion term is implemented in a digital circuit, the Taylor expansion term applied to the output of the magnetic field sensing element $V_{out}$ comprises $$\frac{1}{3}\frac{V_{out}^3}{K^2},$$

where K is a constant, the linearization module includes a first multiplier to multiply the output signal of the magnetic field sensing element, $V_{out}$, by $$\frac{V_{out}}{GV_{cc}\sqrt{3}}$$

to obtain $$\frac{V_{out}^2}{GV_{cc}\sqrt{3}}$$

at the output of the first multiplier, where G is a constant associated with a Wheatstone bridge having $V_{cc}$ as a supply voltage, the linearization module further includes a second multiplier to receive the output of the first multiplier, $$\frac{V_{out}^2}{GV_{cc}\sqrt{3}},$$

and to multiply by $$\frac{V_{out}}{GV_{cc}\sqrt{3}}$$

to generate $$\frac{1}{3}\frac{V_{out}^3}{G^2V_{cc}^2}$$

at the output of the second multiplier, the linearization module further includes an adder to add the output signal generated by the magnetic field sensing element, $V_{out}$, and the output of the second multiplier, $$\frac{1}{3}\frac{V_{out}^3}{G^2V_{cc}^2},$$

to produce $$V_{out} + \frac{1}{3}\frac{V_{out}^3}{G^2V_{cc}^2} \text{ as } V_{out_{new}}$$

at the output of the adder, and/or the third order Taylor expansion term comprises $$\frac{1}{3}\frac{V_{out}^3}{G^2V_{cc}^2},$$

the first multiplier and the second multiplier comprise Gilbert cell type analog multipliers.

In another aspect of the invention, a method comprises: employing a magnetic field sensing element to generate an output signal; employing a signal processing module coupled to the magnetic field sensing element, the signal processing module including a linearization module to apply a third order Taylor expansion term to the output signal generated by the magnetic field sensing element; and employing an output module to receive the linearized signal from the linearization module and provide a device output signal.

The method can further include one or more of the following features: the magnetic field sensing element comprises a GMR element, the magnetic field sensing element comprises one or more of a Hall effect element, a magnetoresistive element, and/or a magnetotransistor, the field sensing element comprises a magnetoresistive element selected from a group consisting of a semiconductor magnetoresistive element, a giant magnetoresistive (GMR) element, an anisotropic magnetoresistive element (AMR), a tunneling magnetoresistive (TMR) element, and a magnetic tunnel junction (MTJ), the magnetic field sensing element comprises magnetic sensors arranged in a Wheatstone bridge configuration, the magnetic sensors are disposed on a shaped conductor for current sensing, first and second ones of the magnetic sensors are magnetically shielded for linear field sensing, the third order Taylor expansion term is implemented in an analog circuit, the third order Taylor expansion term is implemented in a digital circuit, the Taylor expansion term applied to the output of the magnetic field sensing element $V_{out}$ comprises $$\frac{1}{3}\frac{V_{out}^3}{K^2},$$

where K is a constant, the linearization module includes a first multiplier to multiply the output signal of the magnetic field sensing element, $V_{out}$, by $$\frac{V_{out}}{GV_{cc}\sqrt{3}}$$

to obtain $$\frac{V_{out}^2}{GV_{cc}\sqrt{3}}$$

at the output of the first multiplier, where G is a constant and $V_{cc}$ is a supply voltage, the linearization module further includes a second multiplier to receive the output of the first multiplier, $$\frac{V_{out}^2}{GV_{cc}\sqrt{3}},$$

and multiply by $$\frac{V_{out}}{GV_{cc}\sqrt{3}}$$

to generate $$\frac{1}{3}\frac{V_{out}^3}{G^2V_{cc}^2}$$

at the output of the second multiplier, the linearization module further includes an adder to add the output signal generated by the magnetic field sensing element, $V_{out}$, and the output of the second multiplier, $$\frac{1}{3}\frac{V_{out}^3}{G^2V_{cc}^2},$$

to produce $$V_{out} + \frac{1}{3}\frac{V_{out}^3}{G^2V_{cc}^2} \text{ as } V_{out_{new}}$$

at the output of the adder, wherein the third order Taylor expansion term comprises $$\frac{1}{3}\frac{V_{out}^3}{G^2V_{cc}^2},$$

the first multiplier and the second multiplier comprise Gilbert cell type analog multipliers, and/or a supply voltage controls a gain of the magnetic field sensing element over temperature.

In a further aspect of the invention, a magnetic sensor device comprises: a magnetic field sensing element to generate an output signal; a signal processing means coupled to the magnetic field sensing element, the signal processing means to apply a third order Taylor expansion term to the output signal generated by the magnetic field sensing element; and an output means to receive the linearized signal from the signal processing means and provide a device output signal.

DETAILED DESCRIPTION

As used herein, the term "magnetic field sensing element" is used to describe a variety of electronic elements that can sense a magnetic field. The magnetic field sensing element can comprise, but is not limited to, a Hall Effect element, a magnetoresistance element, and/or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, a magnetic tunnel junction (MTJ), and a spin-valve. The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 1:
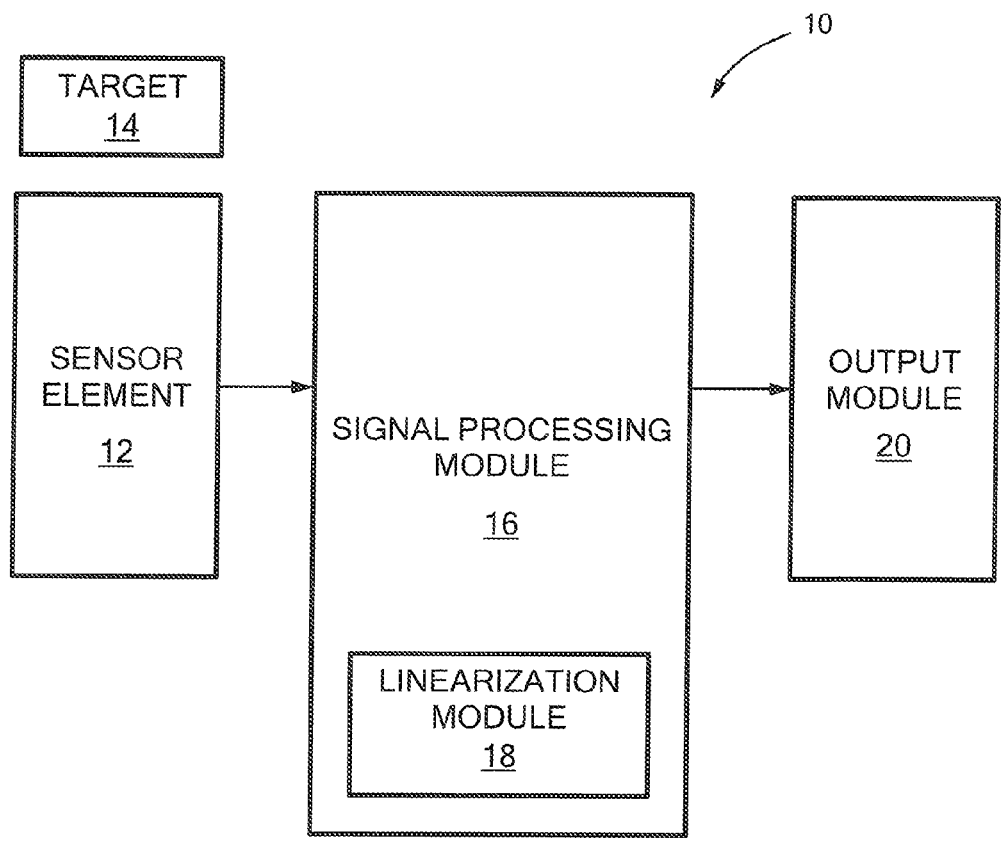
FIG. 1 is a schematic representation of an illustrative magnetic sensor circuit according to an embodiment.

FIG. 1 is a circuit diagram illustrating an example of a magnetic field sensor 10 including a magnetic field sensing element 12 having enhanced linearity in accordance with illustrative embodiments of the invention. The magnetic field sensing element 12 senses a target 14, such as a ferromagnetic gear tooth, that causes changes in a magnetic field. A signal processing module 16 is coupled to the magnetic field sensing element 12 to process the signal from the sensing element. In an illustrative embodiment, the signal processing module 16 includes a linearization module 18 to enhance the linearity of the signal from the sensor element 12, as described more fully below. An output module 20 is coupled to the signal processing module 16 to provide an output signal for a device containing the magnetic field sensor.

Figure 1A:
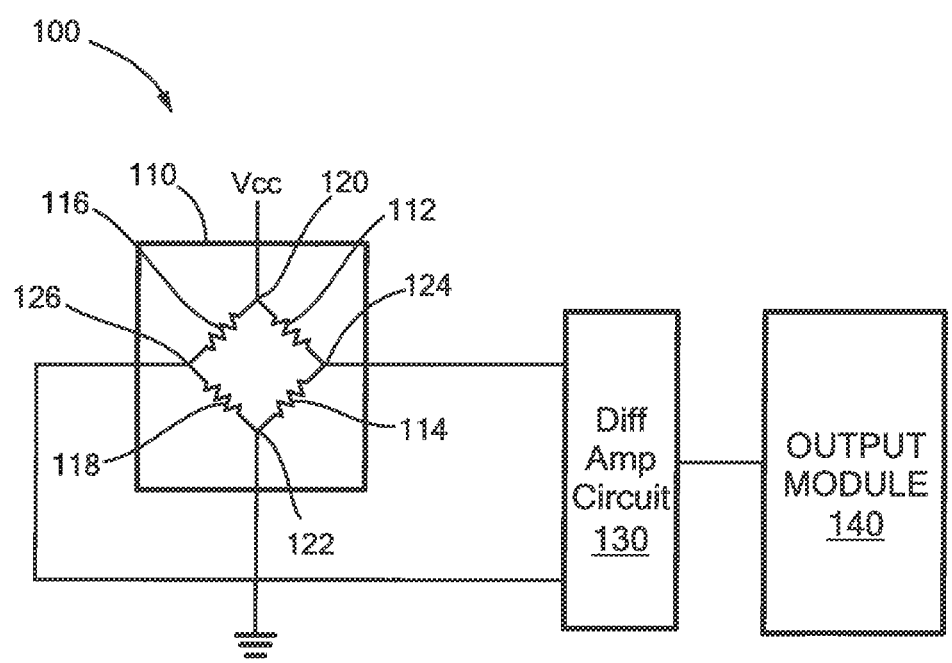
FIG. 1A is a schematic representation showing further detail of the circuit according to FIG. 1.

In one embodiment shown in FIG. 1A, the magnetic field sensing element 12 of FIG. 1 is provided as a GMR element 110 in the form of a Wheatstone bridge as part of a magnetic field sensor 100. The Wheatstone bridge circuit 110 includes magnetic field sensing elements, such as GMR elements 112, 114, 116, 118, disposed on the respective branches of the bridge 110.

In the illustrative embodiment, one end of the GMR element 112 and one end of the GMR element 116 are connected in common to a power supply terminal $V_{cc}$ via a node 120, one end of the GMR element 114 and one end of the GMR element 118 are connected in common to ground via a node 122. The other end of the GMR element 112 and the other end of the GMR element 114 are connected to a node 124, and the other end of the GMR element 116 and the other end of the GMR element 118 are connected to a node 126.

Node 124 of the Wheatstone bridge circuit 110 is connected to a differential amplifier circuit 130. Node 126 is also connected to the differential amplifier circuit 130. A first output of the differential amplifier circuit 130 is connected to an output module 140. In embodiments, Vcc can be used to compensate for gain changes of the GMR elements over process and temperature. It is understood that the differential amplifier circuit 130 can include offset trim to correct for GMR sensor mismatch.

The magnetic field sensing planes of the GMR elements 112, 116 and 114, 118 react to changes in a magnetic field by corresponding resistances changes. GMR elements 112, 118 have maximum and minimum resistances at locations opposite in phase to that of GMR elements 114, 116. This is due to either how the magnetics of the system are set up or different pinning orientations of the elements. As a result, the voltages at the nodes 124, 126 (mid-point voltages) of the Wheatstone bridge circuit 110 also change in a similar fashion.

Magnetoresistance refers to the dependence of the electrical resistance of a sample on the strength of external magnetic field characterized as:

$$\delta_H = \frac{R(0) - R(H)}{R(H)},$$

where R(H) is the resistance of the sample in a magnetic field H, and R(0) corresponds to H=0. The term "giant magnetoresistance" indicates that the value $\delta_H$ for multilayer structures significantly exceeds the anisotropic magnetoresistance, which has a typical value within a few percent.

Giant magnetoresistance (GMR) is a quantum mechanical magnetoresistance effect observed in thin-film structures composed of alternating ferromagnetic and non-magnetic conductive layers. The effect is observed as a significant change in the electrical resistance depending on whether the magnetization of adjacent ferromagnetic layers are in a parallel or an antiparallel alignment. The overall resistance is relatively low for parallel alignment and relatively high for antiparallel alignment. The magnetization direction can be controlled, for example, by applying an external magnetic field. The effect is based on the dependence of electron scattering on the spin orientation. A Wheatstone bridge of four identical GMR devices is insensitive to a uniform magnetic field and is reactive when the field directions are antiparallel in the neighboring arms of the bridge.

Figures 1B, 1C:
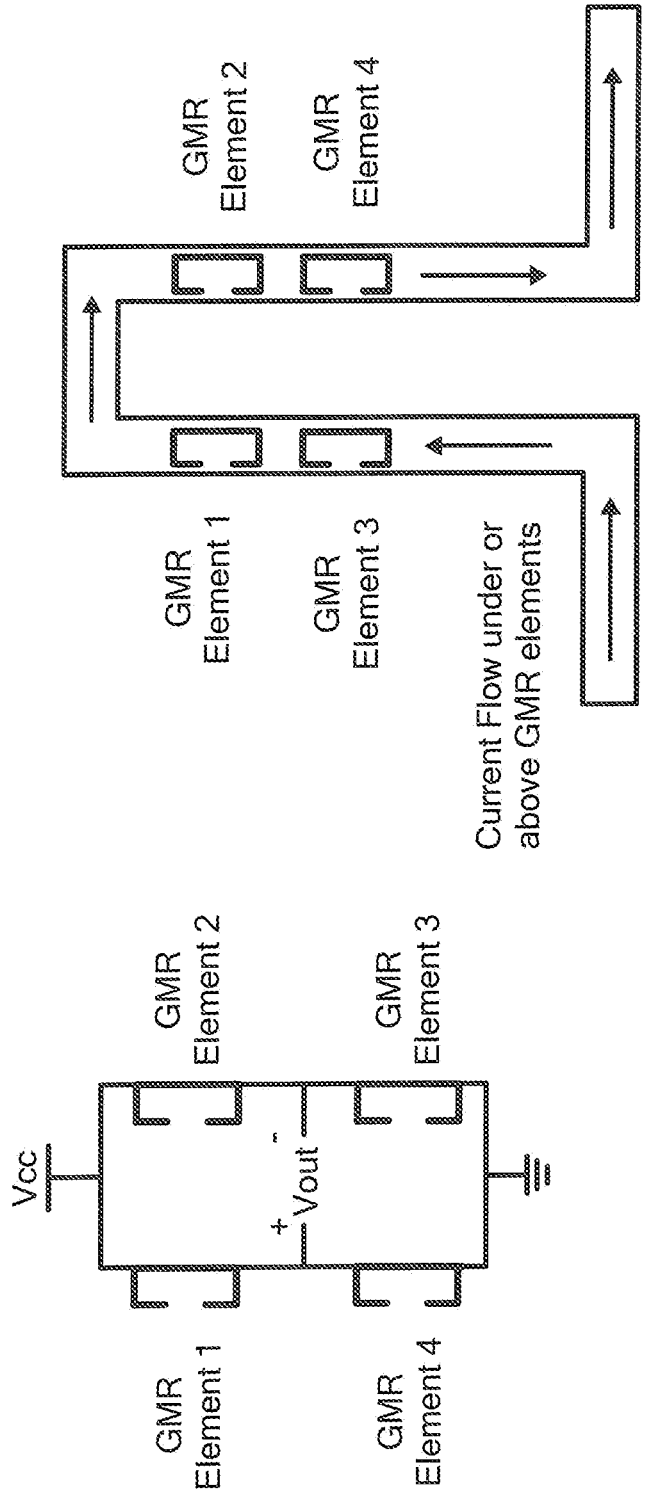
FIGS. 1B and 1C are schematic representations of current sensing for the circuit of FIG. 1.
Figure 1D:
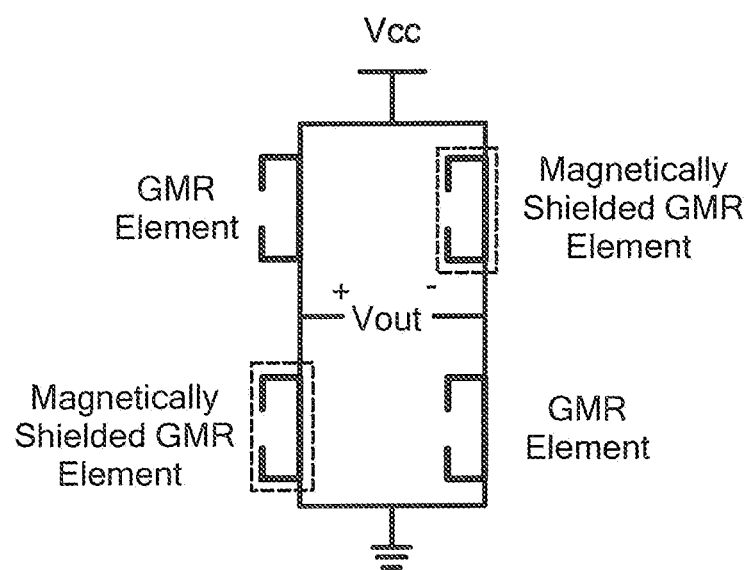
FIG. 1D is a schematic representation of linear sensing for the circuit of FIG. 1.

FIG. 1B shows a circuit having bridge-coupled GMR elements and FIG. 1C shows current flow under or above the GMR elements for a current sensing implementation, where two of the resistors see field in one direction due to the current flow, and the other two see field in the opposite direction due to the current flow. FIG. 1D shows a circuit for linear sensing of an applied field with two of the GMR elements magnetically shielded.

Figure 2A:
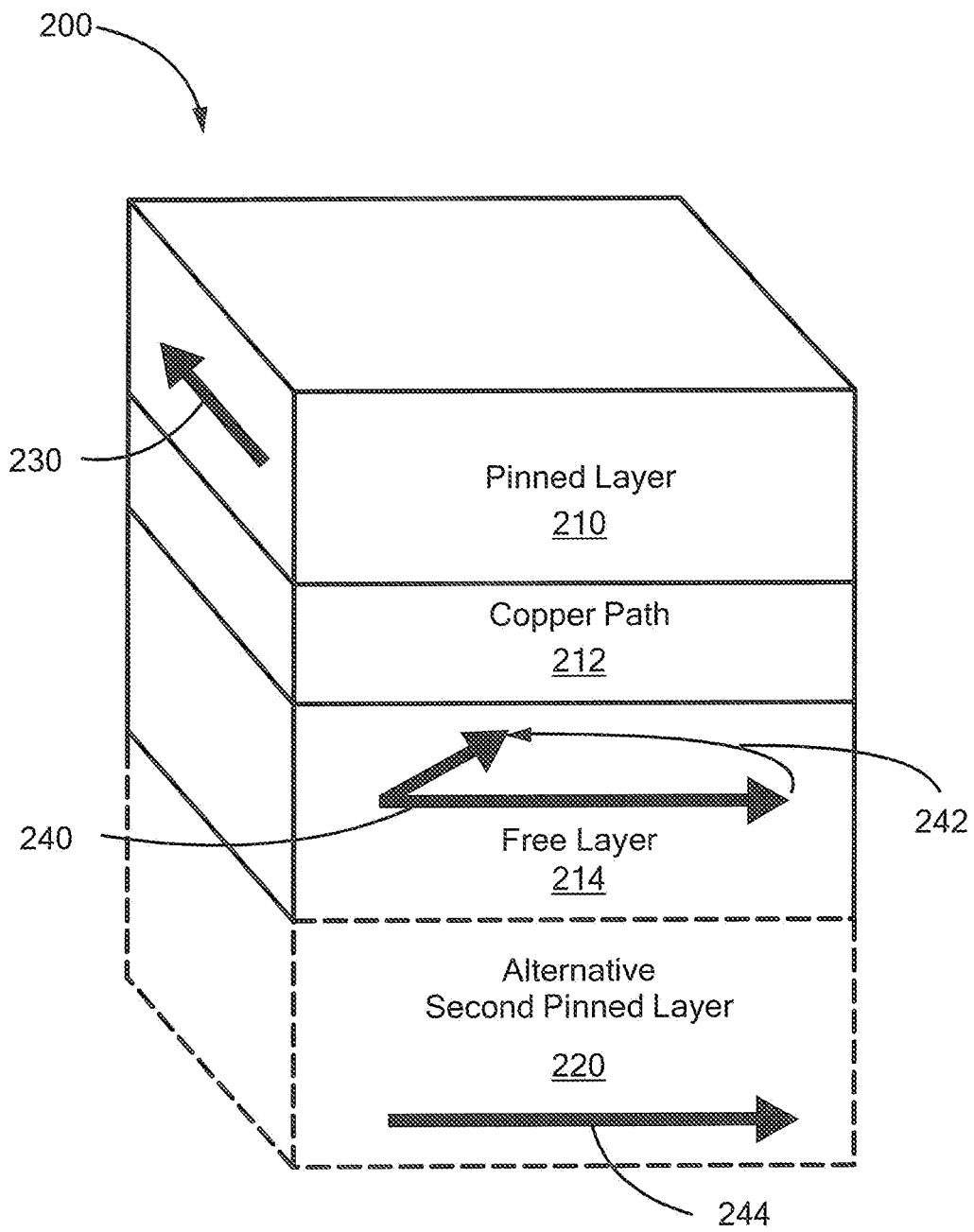
FIGS. 2a-b illustrate an illustrative GMR sensor that can form a part of the circuit of FIG. 1.
Figure 2B:
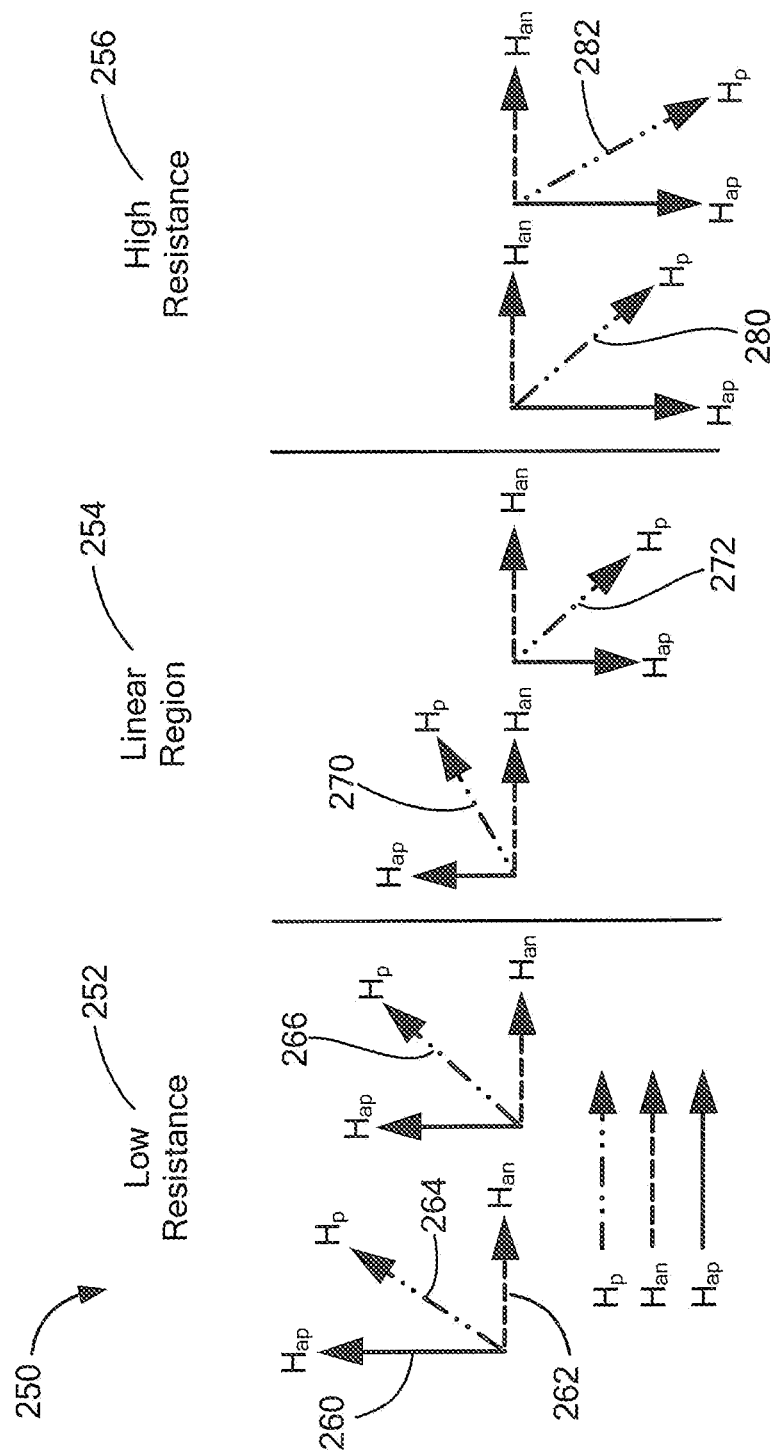

FIGS. 2a-b illustrate a simplified GMR sensor 200 that can form a part of the magnetic field sensor 10 of FIG. 1 according to an embodiment. In FIG. 2a, the GMR sensor 200 includes a pinned layer 210, a metal path 212, such as copper, and a free layer 214. The magnetic orientation of the pinned layer 210 is fixed. The magnetic orientation of the free layer 214 is maintained in a selected alignment through anisotropy or by the shown alternative second pinned layer 220, each of which provide a pinning field, $H_{an}$ 242 (FIG. 2b). The magnetic orientation of the free layer 214 rotates 242 based on the applied field.

As shown, anisotropy may be used to creates a 90° zero applied field orientation 240 of the free layer 220, or a 90° zero applied field orientation 240 may be provided with the second pinned layer 220, which is 90° to the pinned layer.

FIG. 2b shows vector diagrams 250 of orientations of the free layer due to different applied fields: a low resistance region 252, a linear region 254 and a high resistance region 256. As shown in the low resistance region 252, an applied field 260 and a field with a strength of $H_{an}$ at 90° to the pinned layer 210 generate $H_p$ 264. The applied field 260 sums with pinning field $H_{an}$ 262 to determine the direction 264 of the free layer. As the direction 264 of the free layer changes, the resistance of the GMR sensor also changes. The directions $H_p$ of the free layer 270, 272, 280, 282 in the linear region 254 and the high resistance region 256 are also shown using vector diagrams.

Figure 3:
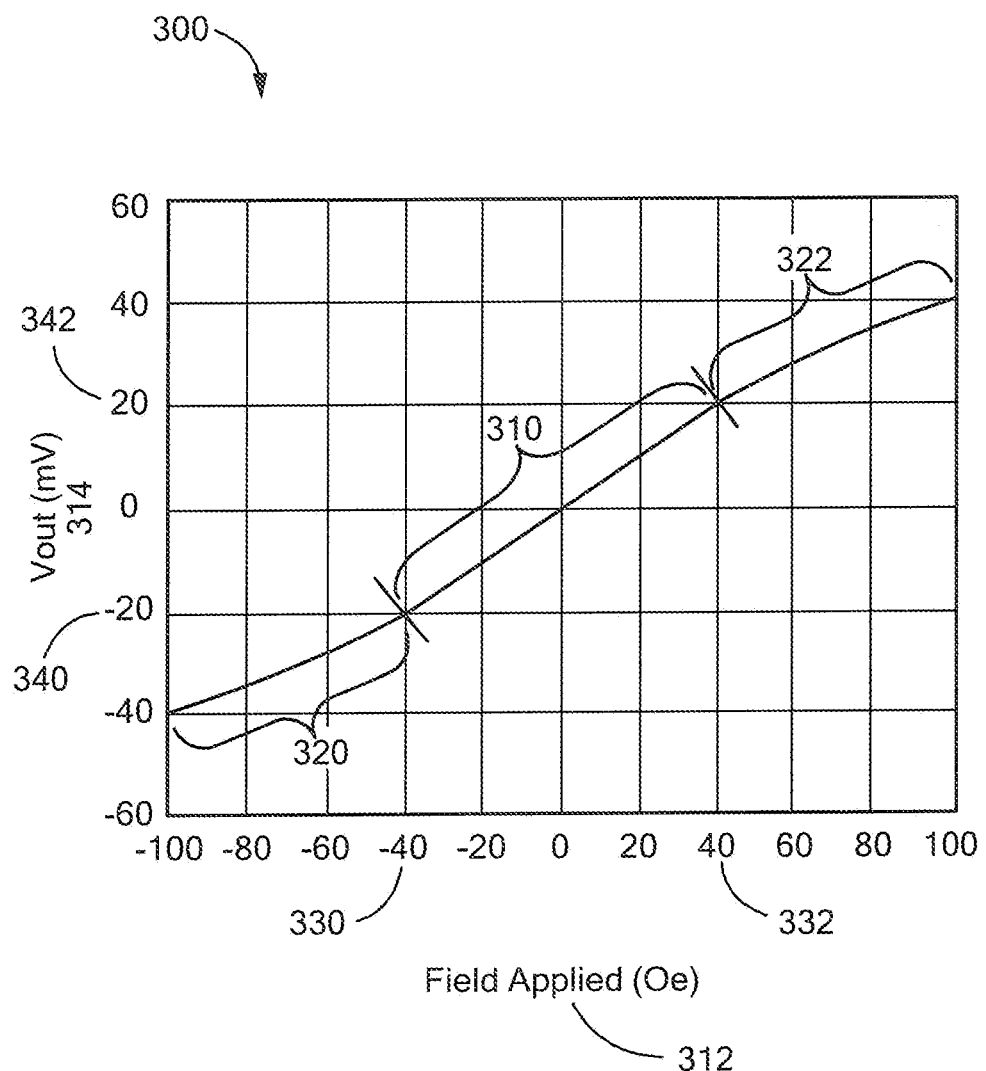
FIG. 3 shows a curve representing a sensor output voltage $V_o$ versus the applied field according to the prior art.

FIG. 3 shows a curve 300 representing the sensor output voltage, $V_o$, versus the applied field according to the prior art. The curve 300 includes a linear region 310 and, at each end, curved portions 320, 322. In FIG. 3, the linear region 310 occurs from an applied field 312 ranging from −40 Oersted (Oe) 330 to 40 Oe 332, and for a $V_{out}$ 314 ranging from −20 millivolts 340 to 20 millivolts 342. It is understood that these values are illustrative.

In embodiments of the invention, when using GMR as a linear sensor, one can use anisotropy or a second pinning layer to create a desired zero field orientation of the free layer, as described above. This field can be referred to as $H_{AN}$. The measured field, $H_{AP}$, is applied perpendicular to $H_{AN}$, pulling the free layer away from being parallel to $H_{AN}$. The free layer will then be at an angle, θ, with reference to $H_{AN}$ which can be calculated as:

$$\theta = \tan^{-1}\left(\frac{H_{AP}}{H_{AN}}\right)$$

The change in resistance of the GMR element is proportional to this angle, so the output of a GMR half or full bridge will be proportional to this angle, which can be set forth as:

$$V_{out} = K\tan^{-1}\left(\frac{H_{AP}}{H_{AN}}\right)$$

Thus, the applied field is:

$$H_{AP} = H_{AN}\tan\left(\frac{V_{out}}{K}\right)$$

The Taylor expansion of this is:

$$H_{AP} \cong \frac{H_{AN}V_{out}}{K} + \frac{1}{3}H_{AN}\left(\frac{V_{out}}{K}\right)^3 = H_{AN}\left[\frac{V_{out}}{K} + \frac{1}{3}\left(\frac{V_{out}}{K}\right)^3\right]$$

Then, scaling this to obtain a more linear output, one arrives at:

$$V_{out_{new}} = H_{AP}\frac{K}{H_{AN}} \cong V_{out} + \frac{K}{3}\left(\frac{V_{out}}{K}\right)^3 = V_{out} + \frac{1}{3}\frac{V_{out}^3}{K^2}$$

When using a GMR Wheatstone bridge, K is equal to a constant, say G, times the bridge supply voltage, or $$K = G \cdot V_{cc}$$

This means that the equation one wants to apply to the output of the GMR bridge in order to enhance linearity is:

$$V_{out_{new}} = V_{out} + \frac{1}{3}\frac{V_{out}^3}{(GV_{cc})^2}$$

A Gilbert cell type analog multiplier, for example, allows one to implement the equation:

$$V_o = V_{in}\frac{I_x}{I_y}$$

Normally, both $I_x$ and $I_y$ are created by voltage controlled current sources, resulting in an effective equation of:

$$V_o = V_{in}\frac{V_x}{V_y}$$

The above can be implemented in a circuit, described below.

Figure 4:
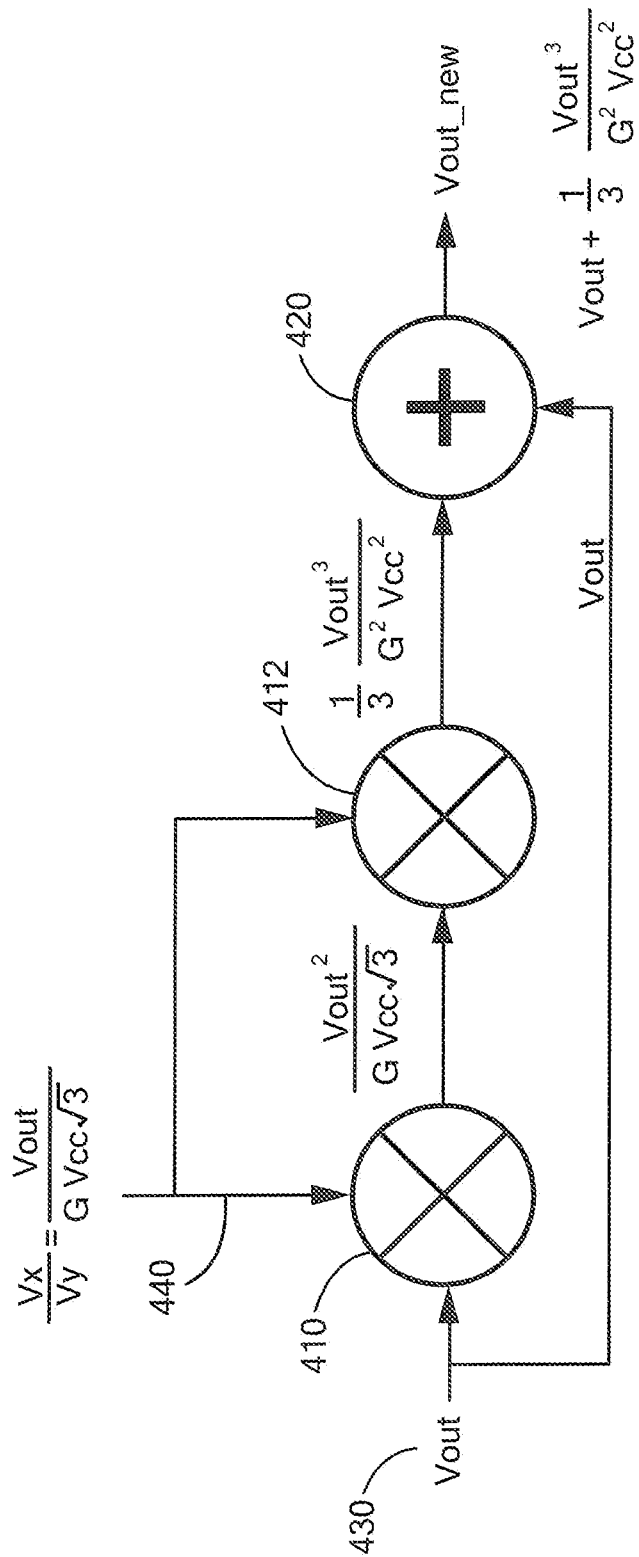
FIG. 4 is an illustrative analog circuit implementation of linearization according to an embodiment.

FIG. 4 shows an illustrative linearization module 400 having first and second multipliers 410, 412 and an adder 420 coupled as shown. The output $V_{out}$ 430 of the magnetic sensing element is provided to the first multiplier 410 and to the adder 420. An input 440 is provided as $$\frac{V_{out}}{GV_{cc}\sqrt{3}}$$

to an input to the first multiplier 410 and to an input of the second multiplier 412. The first multiplier 410 receives the output signal generated by the magnetic field sensing element, $V_{out}$ and input 440 to produce $$\frac{V_{out}^2}{GV_{cc}\sqrt{3}}$$

at the output of the first multiplier 410, where $V_{out}$ is the output signal generated by the magnetic field sensing element, G is a constant and $V_{cc}$ is a supply voltage to the four magnetic sensors arranged in a Wheatstone bridge configuration, for example, such as that shown in FIG. 1A. At the second multiplier 412, the output of the first multiplier 410 is multiplied by input 440 to produce $$\frac{1}{3}\frac{V_{out}^3}{G^2V_{cc}^2},$$

at the output of the second multiplier 412. The output of the second multiplier 412, $$\frac{1}{3}\frac{V_{out}^3}{G^2 V_{cc}^2},$$

is provided to adder 420, which adds the second multiplier output with $V_{out}$ 430 to produce $$V_{out} + \frac{1}{3}\frac{V_{out}^3}{G^2 V_{cc}^2} \text{ as } V_{out_{new}}$$

at the output. Thus, a third order Taylor expansion term is provided as $$\frac{1}{3}\frac{V_{out}^3}{G^2 V_{cc}^2}$$

added to the sensing element output $V_{out}$ to enhance linearization.

Figure 5:
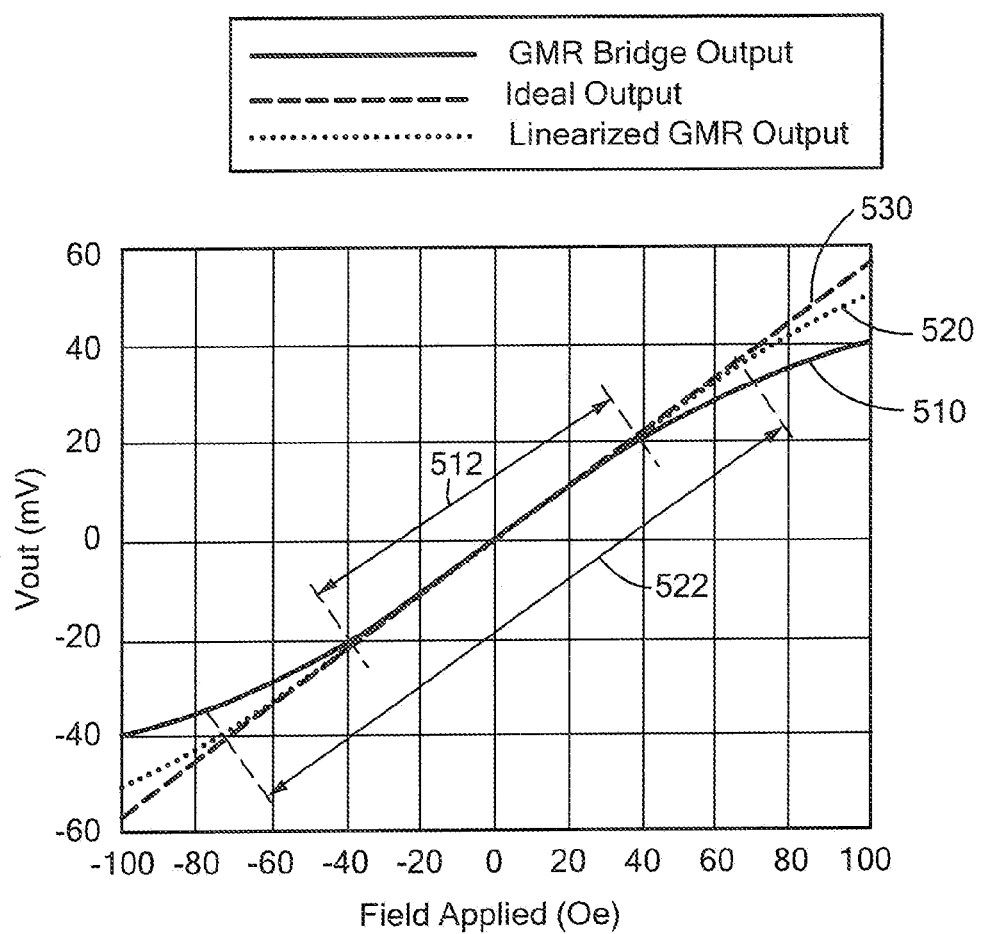
FIG. 5 is a graphical representation of enhanced linearization of a signal from a magnetic sensing element according to an embodiment.

FIG. 5 shows an illustrative increase in linearity of a magnetic field sensor in accordance with illustrative embodiments of the invention. An output curve 510 for a conventional GMR sensor is shown along with a linear output curve 530 for an ideal sensor. Output curve 520 corresponds to a linearized GMR sensor in accordance with illustrative embodiments of the invention. As can be seen, a linear region 512 of the conventional GMR sensor output curve 510 is shorter than the linear region 522 of a linearized GMR output 520 in accordance with illustrative embodiments of the invention. That is, the GMR sensor using Taylor term expansion enhances the linearity of the sensor as compared with a conventional GMR sensor.

Figure 6:
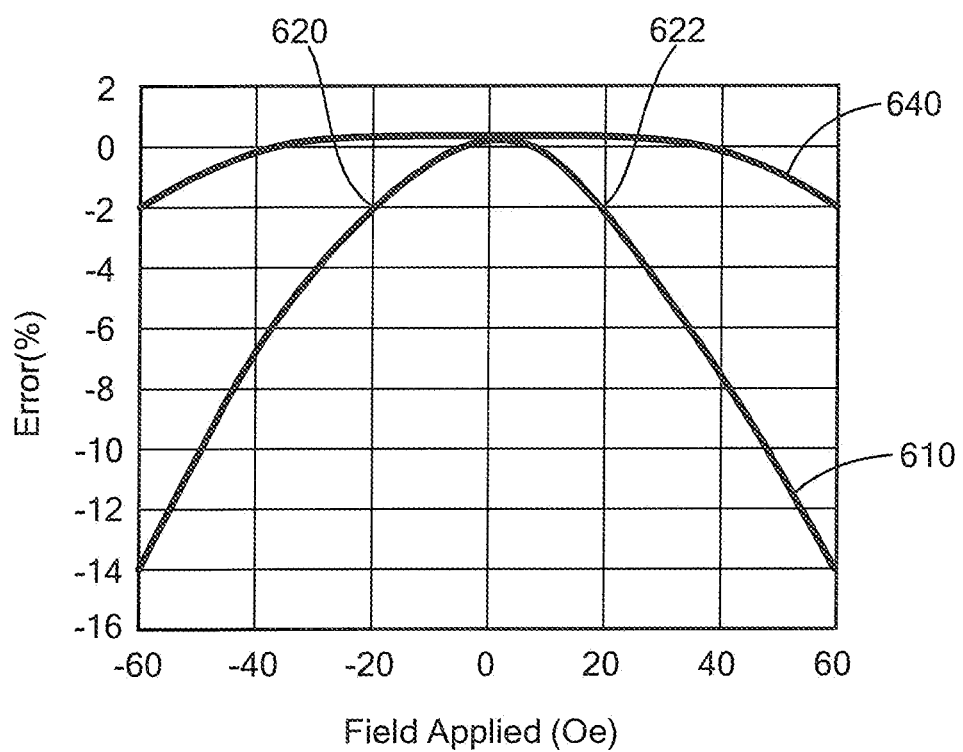
FIG. 6 is a graphical representation of reduction in error from increased linearity according to an embodiment.

FIG. 6 illustrates a reduction in error due to nonlinearity according to an embodiment. A curve for a raw (non-linearized) GMR output 610 has an error of 2% at +/−20 Oe 620, 622. The curve for the linearized GMR output 640 does not reach a 2% error 612 until +/−60 Oe, effectively tripling the linear range of the GMR.

Figure 7:
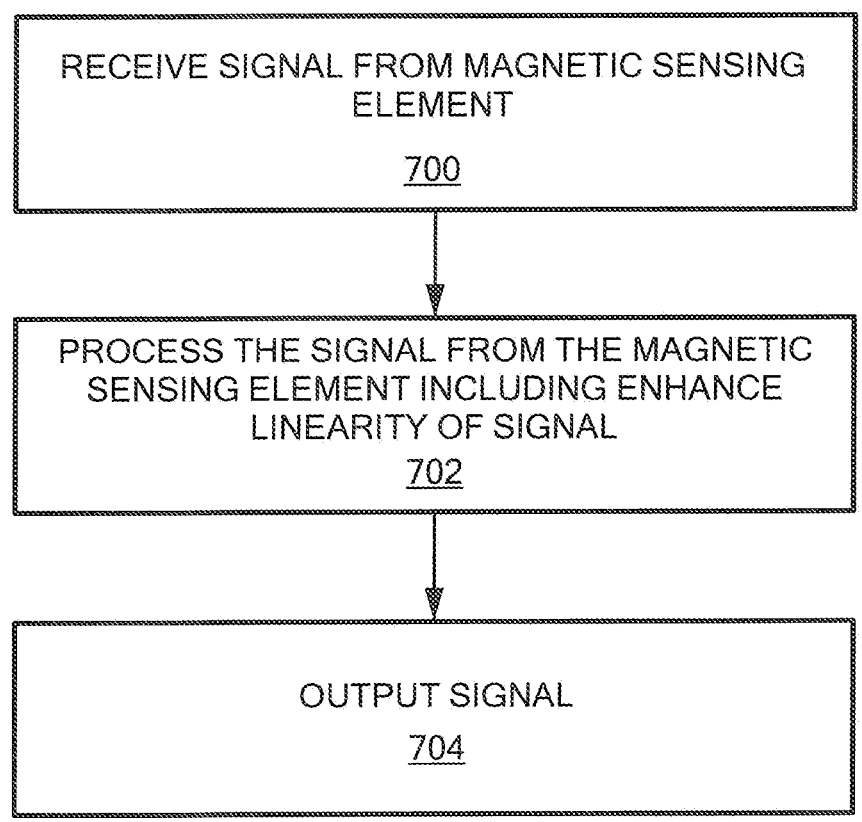
FIG. 7 is a flow diagram showing an illustrative sequence of steps for providing sensor output linearization according to an embodiment.

FIG. 7 shows an illustrative sequence of steps for providing enhanced linearization for a magnetic sensing device. In step 700, a signal from a magnetic sensing element is generated in response to magnetic field changes and received by a signal processing module. In step 702, the signal processing module linearizes the signal from the magnetic field sensing element by applying a third order Taylor expansion term. In one embodiment, the third order Taylor term is implemented in an analog circuit. In other embodiments, the signal from the magnetic sensing element is digitized and processed by a processor. In step 704, the linearized signal is output by a magnetic sensor device.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

While magnetic field sensing elements are illustrated herein as GMR sensors, those skilled in the art will recognize that the principles described herein may be applicable to other types of magnetic field sensing elements.

Figure 8:
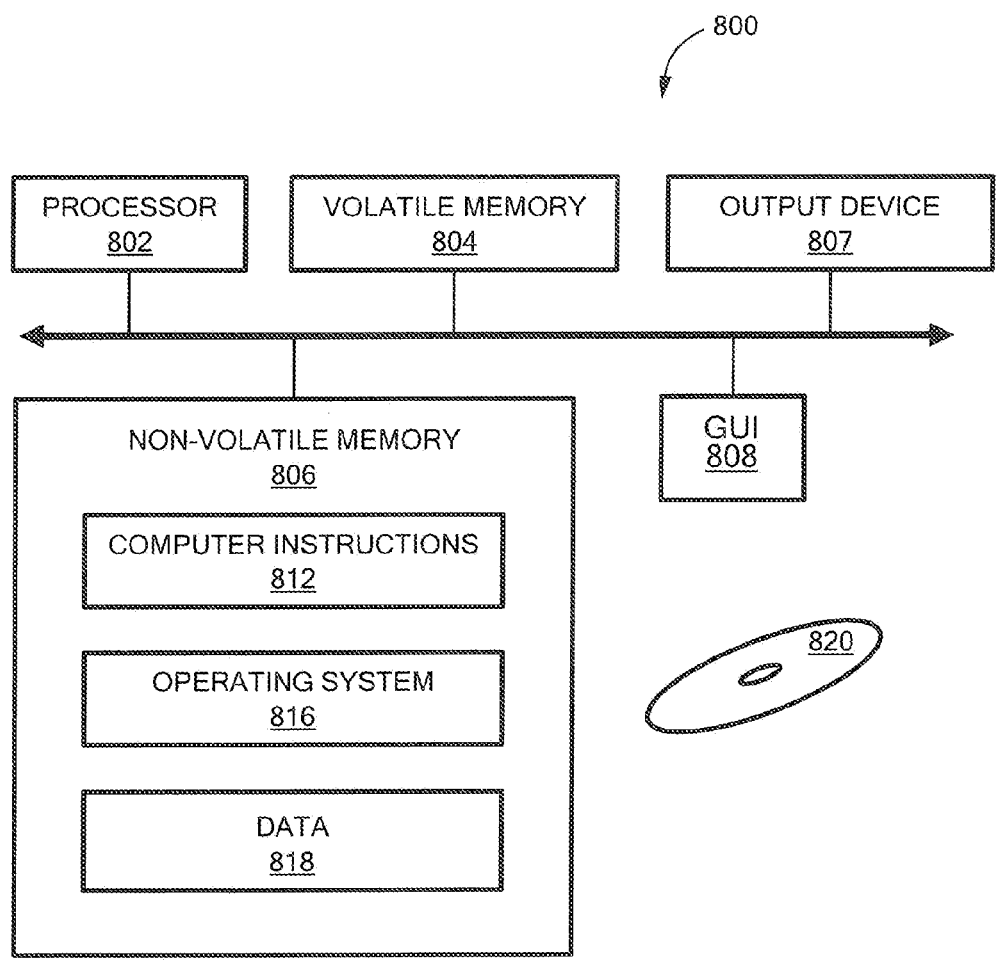
FIG. 8 is a schematic representation of an illustrative computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A magnetic sensor device, comprising:
a magnetic field sensing element to generate an output signal;
a signal processing module coupled to the magnetic field sensing element, the signal processing module including a linearization module to apply a third order Taylor expansion term to the output signal generated by the magnetic field sensing element, wherein the Taylor expansion term applied to the output of the magnetic field sensing element $V_{out}$ comprises $$\frac{1}{3}\frac{V_{out}^3}{K^2}$$

where K is a constant; and
an output module to receive the linearized signal from the linearization module and provide a device output signal.

2. The device according to claim 1, wherein the magnetic field sensing element comprises a GMR element.

3. The device according to claim 1, wherein the magnetic field sensing element comprises one or more of a Hall effect element, a magnetoresistive element, and/or a magnetotransistor.

4. The device according to claim 1, wherein the field sensing element comprises a magnetoresistive element selected from a group consisting of a semiconductor magnetoresistive element, a giant magnetoresistive (GMR) element, an anisotropic magnetoresistive element (AMR), a tunneling magnetoresistive (TMR) element, and a magnetic tunnel junction (MTJ).

5. The device according to claim 1, wherein the magnetic field sensing element comprises magnetic sensors arranged in a Wheatstone bridge configuration.

6. The device according to claim 5, wherein the magnetic sensors are disposed on a shaped conductor for current sensing.

7. The device according to claim 5, wherein first and second ones of the magnetic sensors are magnetically shielded for linear field sensing.

8. The device according to claim 1, wherein the third order Taylor expansion term is implemented in an analog circuit.

9. The device according to claim 1, wherein the third order Taylor expansion term is implemented in a digital circuit.

10. A magnetic sensor device, comprising:
a magnetic field sensing element to generate an output signal;
a signal processing module coupled to the magnetic field sensing element, the signal processing module including a linearization module to apply a third order Taylor expansion term to the output signal generated by the magnetic field sensing element; and
an output module to receive the linearized signal from the linearization module and provide a device output signal, wherein the linearization module includes a first multiplier to multiply the output signal of the magnetic field sensing element, $V_{out}$, by $$\frac{V_{out}}{GV_{cc}\sqrt{3}}$$

to obtain $$\frac{V_{out}^2}{GV_{cc}\sqrt{3}}$$

at the output of the first multiplier, where G is a constant associated with a Wheatstone bridge having $V_{cc}$ as a supply voltage.

11. The device according to claim 10, wherein the linearization module further includes a second multiplier to receive the output of the first multiplier, $$\frac{V_{out}^2}{GV_{cc}\sqrt{3}}$$

and to multiply by $$\frac{V_{out}}{GV_{cc}\sqrt{3}}$$

to generate $$\frac{1}{3}\frac{V_{out}^3}{G^2V_{cc}^2}$$

at the output of the second multiplier.

12. The device according to claim 11, wherein the linearization module further includes an adder to add the output signal generated by the magnetic field sensing element, $V_{out}$, and the output of the second multiplier, $$\frac{1}{3}\frac{V_{out}^3}{G^2V_{cc}^2},$$

to produce $$V_{out} + \frac{1}{3}\frac{V_{out}^3}{G^2V_{cc}^2} \text{ as } V_{out_{new}}$$

at the output of the adder, wherein the third order Taylor expansion term comprises $$\frac{1}{3}\frac{V_{out}^3}{G^2V_{cc}^2}.$$

13. The device according to claim 11, wherein the first multiplier and the second multiplier comprise Gilbert cell type analog multipliers.

14. A method, comprising:
employing a magnetic field sensing element to generate an output signal;
employing a signal processing module coupled to the magnetic field sensing element, the signal processing module including a linearization module to apply a third order Taylor expansion term to the output signal generated by the magnetic field sensing element, wherein the Taylor expansion term applied to the output of the magnetic field sensing element $V_{out}$ comprises $$\frac{1}{3}\frac{V_{out}^3}{K^2},$$

where K is a constant; and employing an output module to receive the linearized signal from the linearization module and provide a device output signal.

15. The method according to claim 14, wherein the magnetic field sensing element comprises a GMR element.

16. The method according to claim 14, wherein the magnetic field sensing element comprises one or more of a Hall effect element, a magnetoresistive element, and/or a magnetotransistor.

17. The method according to claim 14, wherein the field sensing element comprises a magnetoresistive element selected from a group consisting of a semiconductor magnetoresistive element, a giant magnetoresistive (GMR) element, an anisotropic magnetoresistive element (AMR), a tunneling magnetoresistive (TMR) element, and a magnetic tunnel junction (MTJ).

18. The method according to claim 14, wherein the magnetic field sensing element comprises magnetic sensors arranged in a Wheatstone bridge configuration.

19. The method according to claim 18, wherein the magnetic sensors are disposed on a shaped conductor for current sensing.

20. The method according to claim 18, wherein first and second ones of the magnetic sensors are magnetically shielded for linear field sensing.

21. The method according to claim 14, wherein the third order Taylor expansion term is implemented in an analog circuit.

22. The method according to claim 14, wherein the third order Taylor expansion term is implemented in a digital circuit.

23. A method comprising:
employing a magnetic field sensing element to generate an output signal;
employing a signal processing module coupled to the magnetic field sensing element, the signal processing module including a linearization module to apply a third order Taylor expansion term to the output signal generated by the magnetic field sensing element; and
employing an output module to receive the linearized signal from the linearization module and provide a device output signal,
wherein the linearization module includes a first multiplier to multiply the output signal of the magnetic field sensing element, $V_{out}$, by $$\frac{V_{out}}{GV_{cc}\sqrt{3}}$$

to obtain $$\frac{V_{out}^2}{GV_{cc}\sqrt{3}}$$

at the output of the first multiplier, where G is a constant and $V_{cc}$ is a supply voltage.

24. The method according to claim 23, wherein the linearization module further includes a second multiplier to receive the output of the first multiplier, $$\frac{V_{out}^2}{GV_{cc}\sqrt{3}},$$

and multiply by $$\frac{V_{out}}{GV_{cc}\sqrt{3}}$$

to generate $$\frac{1}{3}\frac{V_{out}^3}{G^2V_{cc}^2}$$

at the output of the second multiplier.

25. The method according to claim 23, wherein the linearization module further includes an adder to add the output signal generated by the magnetic field sensing element, $V_{out}$, and the output of the second multiplier, $$\frac{1}{3}\frac{V_{out}^3}{G^2V_{cc}^2},$$

to produce $$V_{out}+\frac{1}{3}\frac{V_{out}^3}{G^2V_{cc}^2} \text{ as } V_{out_{new}}$$

at me output of the adder, wherein the third order Taylor expansion term comprises $$\frac{1}{3}\frac{V_{out}^3}{G^2V_{cc}^2}.$$

26. The method according to claim 23, wherein the first multiplier and the second multiplier comprise Gilbert cell type analog multipliers.

27. The method according to claim 14, wherein a supply voltage controls a gain of the magnetic field sensing element over temperature.

28. A magnetic sensor device, comprising:
a magnetic field sensing element to generate an output signal;
a signal processing means coupled to the magnetic field sensing element, the signal processing means to apply a third order Taylor expansion term to the output signal generated by the magnetic field sensing element, wherein the Taylor expansion term applied to the output of the magnetic field sensing element $V_{out}$ comprises $$\frac{1}{3}\frac{V_{out}^3}{K^2},$$

where K is a constant; and an output means to receive the linearized signal from the signal processing means and provide a device output signal.

29. The device according to claim 28, wherein the magnetic field sensing element comprises a GMR element.

30. The device according to claim 28, wherein the magnetic field sensing element comprises magnetic sensors arranged in a Wheatstone bridge configuration.

31. The device according to claim 30, wherein the magnetic sensors are disposed on a shaped conductor for current sensing.

32. The device according to claim 30, wherein at least one of the magnetic sensors is magnetically shielded for linear field sensing.

33. The device according to claim 28, wherein the third order Taylor expansion term is implemented in an analog circuit.

* * * * *